April 12, 1960     A. KRAVITZ     2,932,510
PORTABLE BALLET BAR
Filed June 9, 1958                        2 Sheets-Sheet 1
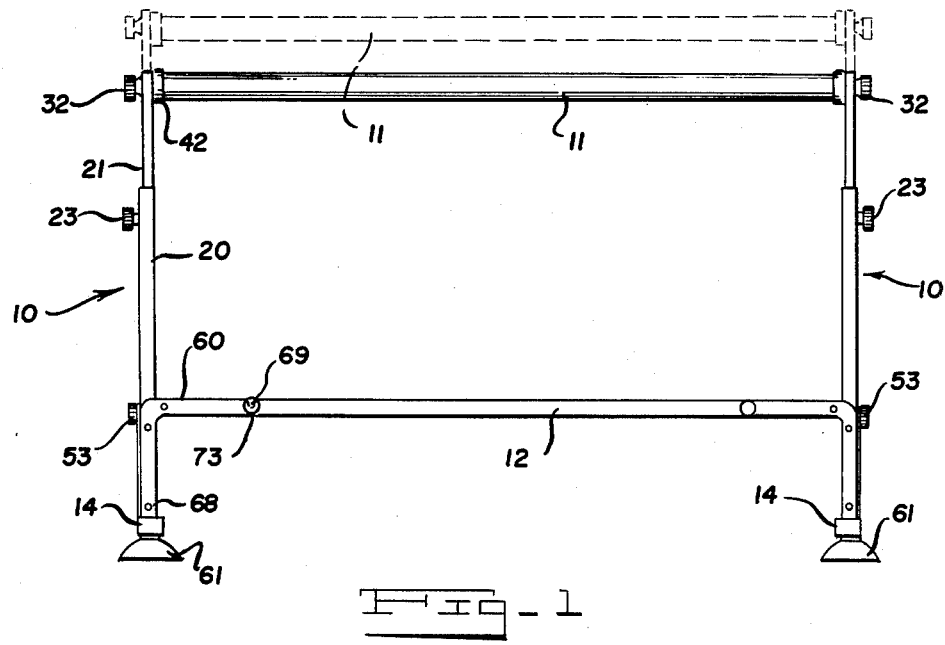
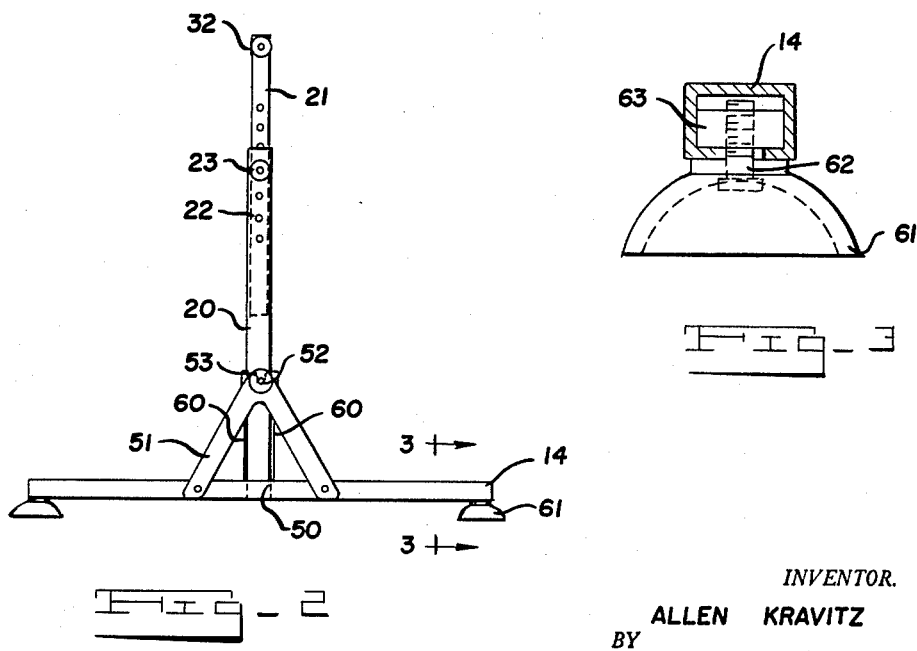
INVENTOR.
ALLEN KRAVITZ
BY
Cullen & Cantor
ATTORNEYS

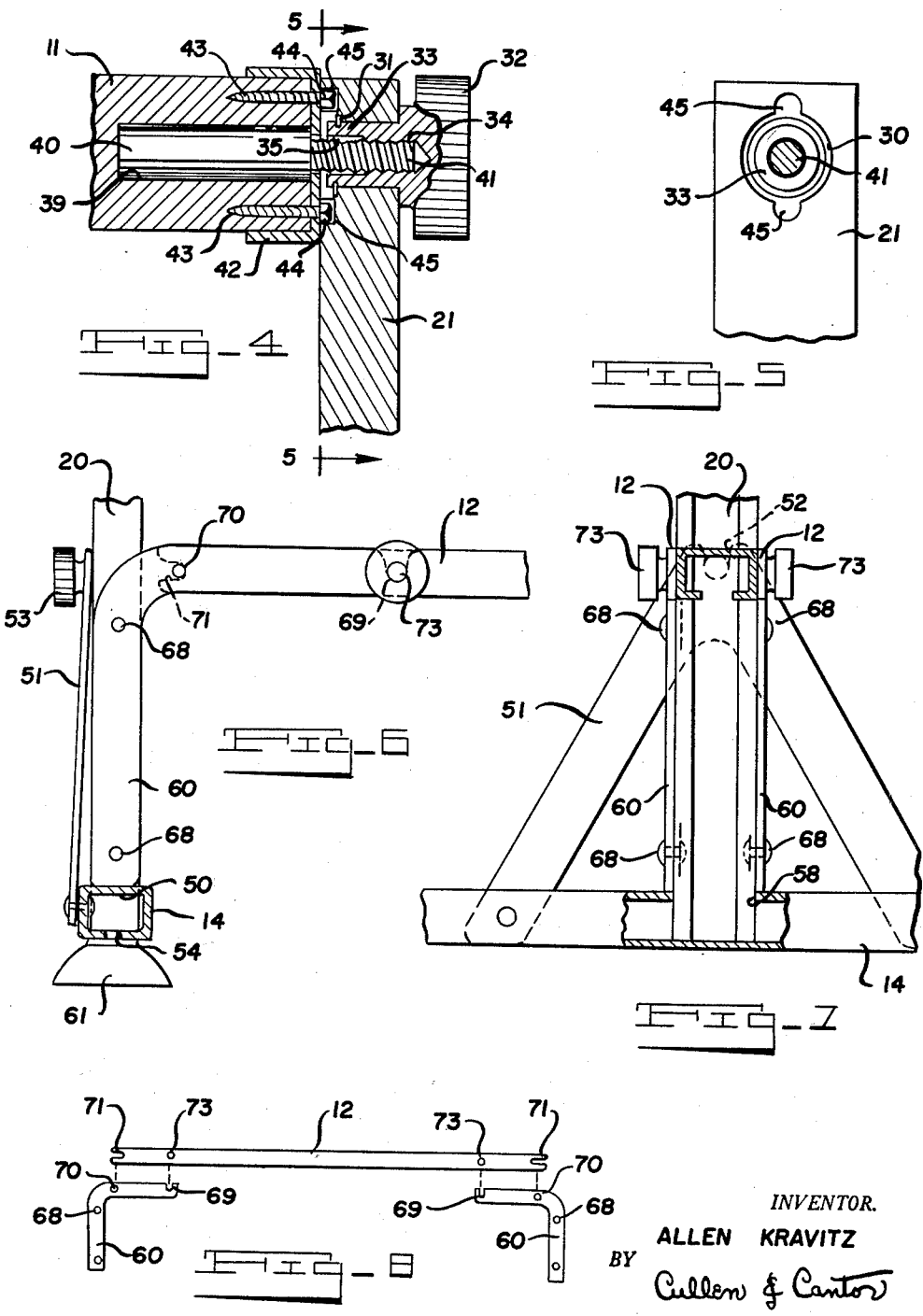

United States Patent Office 2,932,510
Patented Apr. 12, 1960

2,932,510

PORTABLE BALLET BAR

Allan Kravitz, Detroit, Mich.

Application June 9, 1958, Serial No. 740,962

1 Claim. (Cl. 272—62)

This application relates to ballet bars of the type used by dancers in their practice and exercise work.

The principal object of the present invention is to provide a portable knock-down ballet bar which when assembled is rigid enough to satisfy the demand for a rigid exercise or ballet bar and yet which is light enough so that it can be moved from place to place and which is formed of parts which can be knocked down or assembled readily to form a satisfactory device for the purposes described.

For an understanding of the ballet bar hereof reference should be had to the drawing which follows:

In these drawings,

Fig. 1 is a front view of the ballet bar completely assembled.

Fig. 2 is a side view as if looking from the left of Fig. 1.

Fig. 3 is a fragmentary section view on line 3—3 of Fig. 2.

Fig. 4 is a fragmentary section view of an upper portion of the device.

Fig. 5 is a view as if on line 5—5 of Fig. 4.

Fig. 6 is a fragmentary enlarged view of the lower portion of the device.

Fig. 7 is a view as if from the right of Fig. 6.

Fig. 8 is an exploded view of certain of the parts.

The ballet bar herein described comprises two vertical members 10 connected at their upper and lower ends by horizontal members 11—12 and having transverse members 14 which support the entire structure.

Each vertical member comprises a C-shaped channel 20 in which is adjustably telescoped a solid rod 21 having three holes 22 for interlocking cooperation with one adjusting screw 23.

At the upper end of each rod 21 is a receptacle for receiving an end of the upper horizontal bar 11, comprising a non-circular shallow socket 30 on the inner face of the rod 21 in whose center is journalled and retained, by a split ring 31, a locking nut 32, having its hub 33 formed with a bore having a threaded part 34 and an unthreaded part 35.

The horizontal bar 11 is of wood and is formed at each end with a squared socket 39 receiving the squared shank 40 of a screw 41 whose threaded portion projects outwardly through the center hole of a cap 42 fastened over the end of the bar 11 by two screws 43 whose heads 44 provide a non-circular projection which fits within the opposite upper and lower ends 45 of the non-circular socket 30 to prevent rotation of the bar 11 when the latter is mounted in the upright bars 21 and the locking nuts 32 tightened.

Even though the locking nuts 32 are threaded out so that their threads 34 do not engage the threads of the screws 41 on the ends of the bar 11, nevertheless, the receptacles will still hold the bar in place and prevent it from dropping accidentally because the unthreaded portions 35 of the bores of the hubs 33 of the locking nuts 32 previously described hold the ends of the screws 41 on the ends of the bar 11.

Each transverse member 14 is formed of C-channel and has a rectangular slot 50 in its upper face and an angle shaped strap 51 riveted to it which has a slot 52 at its apex. The lower end of each vertical C-shaped channel 20 is formed to fit in the slot 50 of the transverse member and has a threaded stud or locking screw 53 fixed to it rotatably by a split retaining ring to seat in the slot 52 at the apex of the angle shaped strap 51 while the lower end of the upright channel 20 seats in the slot 50 of the upper surface of the transverse member 14.

At the ends of the transverse members are rubber suction cups 61. Each suction cup 61 has molded within it a screw 62 whose shank projects upwardly and is threaded into a nut forming square block 63 inserted into the open end of a transverse member 14.

The vertical members 20 have cantilevering L-shaped straps 60 securely riveted in place at 68. Straps 60 have open upper end slots 69 and transverse axle pins or pivots 70 which braces the straps and also provides pivot mountings or connections between the cantilever members 60 and the horizontal member 12 of C-shaped channel formation, the latter having end slots 71 which receive the pivots 70. Locking screws or pins 73 on opposite sides of the horizontal bar 12 seat into slots 69 on the ends of members 60.

The foregoing completes the description of the parts themselves. The assembly starting from the beginning will now be described. First, the suction cups 61 are mounted into the ends of the horizontal transverse members 14. Then the two vertical members 20 are mounted in the transverse members 14 and the locking screws 53 tightened. Then the horizontal member 12 is mounted at its ends in the uprights 20 by the cooperation of the slots 71 in the ends of the horizontal member 12 with the pivot pins 70 of the vertical members 20 and by the cooperation of the locking screws 73 of the horizontal member 12 with the slots 69 of the L-shaped cantilever straps 60 of the vertical members 20. Into the vertical members 20 are now telescoped the vertical rods 21. The frame is now ready to receive the horizontal wooden bar 11 and this assembly is completed simply by inserting the screws 41 at the ends of the wooden bar 11 into the hubs 33 of the locking nuts 32 on the upper ends of the uprights 21. Then, the two locking nuts 32 are tightened to complete the assembly.

For adjustment of height after assembly, the adjusting screws 23 and holes 22 are relied upon.

Any tendency of the parts to separate due to vibrations induced by the shaking of the wooden bar 11 along its longitudinal axis is opposed in the following manner. If the entire structure is so vibrated from such a cause, the effect is to move the two upright members 10 together in the same direction. While this has a tendency to pull one set of pins 73 up and out of the slots 69 at the end of the adjacent L-shaped straps 60, this is opposed by the fact that at the other vertical member, the pins 73 at this point tend to be jammed downward further into the slots 69 at the ends of the cantilever 60. Since this cannot take place because the maximum depth of the slots 69 has already been reached by the locking screws 73 during the initial assembly of the parts, the engagement of the parts at this point prevents separation of the entire structure due to vibrations so caused.

If for any reason the wooden bar 11 is removed from the assembly, the removal process is such that the wooden bar will remain in assembly, though not tightly or firmly, even though the locking nuts 32 are completely threaded out. This feature is provided by the engagement of the screws 41 at the ends of the wooden bar with the unthreaded portions 35 of the bores of the hubs 33 of the locking nuts 32.

Now having described the construction herein dis-

I claim:

In a ballet bar, two vertical members, an upper, horizontally arranged, bar and means securing the opposite ends of the bar to the vertical members, said means holding the bar against rotation relative to the vertical members but being adjustable in a vertical direction for vertical adjustment of the bar, and a lower horizontal member at the lower ends of the vertical members, and means for securing each end of the lower horizontal member to a vertical member comprising a pair of L-shaped straps on opposite faces of each vertical member, the straps having horizontal projections cantilevered inwardly from each vertical member, each horizontal projection having at its free end a vertical open upper end slot; a transverse pivot pin connecting two straps to a vertical member and to each other and having projecting ends; said horizontal member having at each end transverse pins in said slots, and having an end slot receiving the projecting ends on the pivot pin.

References Cited in the file of this patent

UNITED STATES PATENTS

| | | |
|---|---|---|
| 399,632 | Reach | Mar. 12, 1889 |
| 1,495,536 | Smith | May 27, 1924 |
| 1,538,272 | Cook | May 19, 1925 |

FOREIGN PATENTS

| | | |
|---|---|---|
| 862,797 | France | Mar. 14, 1941 |